United States Patent Office 2,788,349
Patented Apr. 9, 1957

2,788,349
N-CARBAMYLIMIDES

Robert H. Snyder, Newark, N. J., assignor to United States Rubber Company, New York, N. Y., a corporation of New Jersey No Drawing. Application July 9, 1953,
Serial No. 367,108

11 Claims. (Cl. 260—326.3)

This invention relates to the preparation of a new class of chemicals, the monomeric N-carbamylimides derived from intramolecular anhydrides of acyclic dicarboxylic acid wherein the carboxylic groups are separated by two carbon atoms. These N-carbamylimides have the formula

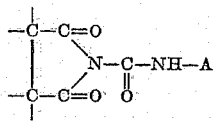

wherein A is hydrogen or a hydrocarbon radical, and the remaining bonds are connected only to hydrogen or to monovalent acyclic hydrocarbon groups or to an adjacent carbon of the shown tetercycle; in the most important aspect of the invention said remaining bonds are so arranged that the compound contains one olefinic group >C=C< which is in a position alpha to at least one of the carbonyl groups.

This application is a continuation-in-part of my application Serial No. 312,870, filed October, 2, 1952, now abandoned.

An object of the invention is to provide a novel process of making the new class of chemicals. A further object is to provide a new method of making cyclic imides, corresponding to the cyclic anhydrides, from the said new chemicals. Other objects will be apparent from the description hereinafter.

According to the invention, I have found that each of the said N-carbamylimides can be prepared directly by the interaction of an N-carbamylamic acid [1] (made from a urea and one of the said cyclic anhydrides) and an anhydride of a saturated aliphatic monocarboxylic acid having from two to four carbon atoms.

The reaction between the two said reagents forms directly the desired N-carbamylimide, even in the presence of the evolved acid and of any unchanged non-cyclic acid anhydride. The reaction for preparation of the N-carbamylimides is represented as follows:

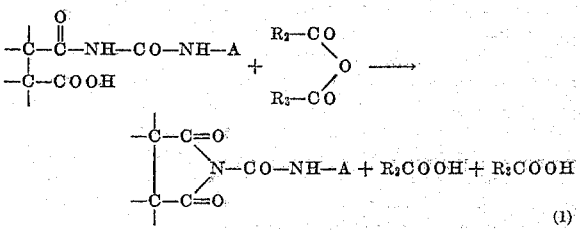

wherein R₂ and R₃ are alkyl radicals having not more than three carbon atoms each.

The reaction is surprising in view of the fact that urea and N-monosubstituted ureas normally react with such a non-cyclic anhydride to form only N-acyl ureas.

[1] The term "amic acid" is used herein to denote a monoamide of a dicarboxylic acid, in accordance with nomenclature adopted by Chemical Abstracts, 39, 5899 (Section 165), (1945).

The said unexpected reaction can serve most usefully as an intermediate step in the production of cyclic imides corresponding to the cyclic anhydrides from which my new N-carbamylimides are made. I have discovered that these N-carbamylimides are easily converted to the corresponding cyclic imides in high yields, i. e., often above 80% of theory, by heating the N-carbamylimides above their respective decomposition temperatures. I consider this new method of making such cyclic imides to be a part of my invention.

The chemical reaction involved in my new process of making these cyclic imides is as follows:

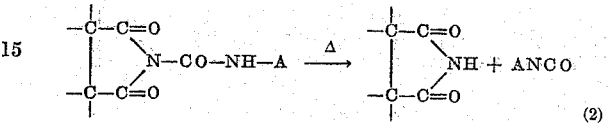

The non-cyclic anhydride used in Reaction 1 can be either symmetrical or unsymmetrical, i, e., it can be acetic anhydride, propionic anhydride, butyric anhydride, isobutyric anhydride, or a mixed anhydride of any two of the four acids acetic, propionic, butyric, or isobutyric acid, e. g., acetic propionic anhydride. However, for reasons of economy I prefer to use acetic anhydride, which hereinafter will be used to exemplify this class of anhydrides.

The minimum amount of acetic anhydrides required obviously is one mol per mol of N-carbamylamic acid, so that the water split out in the reaction becomes chemically bound and thus unable to cause reversal of the reaction. Usually, I prefer to use an excess of acetic anhydride as a solvent medium, but I can also use little or no excess provided that some other solvent is used therewith, merely as a diluent. An appropriate solvent is the acid, e. g., acetic acid, related to the non-cyclic anhydride used, a suitable amount being added besides that formed in the reaction. In the absence of solvent the mixture becomes too thick with the crystallized product to be handled conveniently.

My Reaction 1 can be carried out at any desired temperature below about 140° C., but it is convenient to operate at or below the boiling point of the solution at atmospheric pressure so as to avoid the use of pressure equipment. For example, the reaction is substantially complete in about 30 minutes at 100° C. Below about 90° C. the reaction is too slow. Above about 140° C. the product begins to decompose into the corresponding imide.

The mother liquor from the preparation of the N-carbamylimide can be used as the reaction medium for making more of the same compound, provided that at least one mol of the non-cyclic anhydride is present, or is added, per mol of N-carbamylamic acid freshly added. As the mother liquor is repeatedly re-used it becomes diluted to an inconvenient extent with the aliphatic acid formed from the non-cyclic anhydride. This excess acid can be distilled from the solution.

The new N-carbamylimides can be converted into the corresponding imides, as shown in Reaction 2, by heat alone, or at a lower temperature with the assistance of a catalyst, such as zinc chloride, with or without an appropriate solvent for the N-carbamylimide. The catalytic method is preferred since it reduces the tendency toward polymerization and/or side reactions. For this reason I operate at as low a temperature as possible consistent with reasonably rapid formation of the imide in good yield and of good purity.

The zinc chloride can be used either with a solution of the N-carbamylimide in a suitable solvent, or with molten N-carbamylimide.

Appropriate solvents for the N-carbamylimides include N,N-dimethylformamide and o-dichlorobenzene. Dimethylformamide acts not only as a solvent for the N-carbamylimide but also as a catalyst, with or without an additional catalyst such as zinc chloride.

The catalytic effect of zinc chloride and dimethylformamide is often considerable. For example, N-carbamylmaleimide is converted to maleimide by heat alone at about 180° C. By the use of zinc chloride added to the molten N-carbamylmaleimide, maleimide can be formed as rapidly at 140° C. as it is at 180° C. without a catalyst. In dimethylformamide, N-carbamylmaleimide is converted rapidly to maleimide in excellent yield and purity at 100° C. These temperatures are merely illustrative. Other N-carbamylimides decompose to the corresponding imides at other temperatures. For example, N-carbamylsuccinimide is converted, in vacuo, to succinimide at 120° C. in the absence of a solvent or catalyst. The temperature best suited to the conversion of any particular N-carbamylimide to the corresponding imide can be determined easily by obvious experimentation.

When the conversion is carried out in the absence of a solvent I prefer to operate under reduced pressure in order to minimize undesirable side reactions. This pressure can be varied over wide limits. It is usually held below about 100 mm. of mercury but preferably above that pressure at which a substantial amount of the N-carbamylimide sublimes or distills without decomposition at the particular temperature used. In other words, the pressure should not be so low that the N-carbamylimide is kept below its temperature of decomposition.

My new N-carbamylimides fall into two groups insofar as their conversion to the imides is concerned. Those N-carbamylimides which are made from urea itself, i. e., those in which the group A is hydrogen, decompose to form isocyanic acid as the second product shown in Reaction 2. Isocyanic acid is an unstable material which polymerizes rapidly to cyanuric acid. On the other hand, those N-carbamylimides made from N-substituted ureas, i. e., those in which the group A is a hydrocarbon radical, decompose to form esters of isocyanic acid. These valuable esters are stable, and can be recovered as such by distillation.

During the conversion of the N-carbamylimides made from urea, at higher temperatures without a solvent, part of the isocyanic acid formed distills rapidly from the reaction mix and subsequently polymerizes, and the other part polymerizes to cyanuric acid and remains in the molten reaction mix from which the imide is subsequently distilled. When the decomposition, Reaction 2, is carried out at lower temperatures with a solvent, the isocyanic acid polymerizes in the solution to cyanuric acid which precipitates from solution in easily filterable condition. Cessation of the visible formation of cyanuric acid, and of the evolution of heat, can be used to determine when the reaction is complete. For these reasons, a solvent process using, for example, dimethylformamide, is preferred, with or without additional catalyst such as zinc chloride.

The amount of catalyst and/or solvent in Reaction 2 may vary widely; the maximum amount is not critical. However, for economy there is generally used not more than about 20 parts of zinc chloride or other catalyst, nor more than about 150 parts (by weight, based on 100 parts of the N-carbamylimide) of a solvent such as dimethylformamide. Greater amounts have no additional catalytic effect. If the amount of zinc chloride and/or dimethylformamide is markedly decreased, of course the catalytic effect decreases. However, the use of as little as one part of zinc chloride effects an improvement over the use of heat alone. When the reaction is carried out in solution I usually use at least enough dimethylformamide to dissolve all of the N-carbamylimide. Of course, I can also use less solvent, thus making a slurry of the N-carbamylimide, which makes stirring and filtration difficult.

Optionally, when using a solvent in Reaction 2 I can also add an auxiliary liquid before or during the reaction, in order to thin the solution and to cause the cyanuric acid to crystallize in more easily filterable condition. Such a liquid must not react with the reagent nor with the produced imide, but need not be a solvent for either of them. Typical of such liquids are benzene, toluene, the xylenes, liquid petroleum fractions and other inert liquids miscible with dimethylformamide and boiling above about 80° C. at atmospheric pressure. The usable amount of this auxiliary liquid varies with the liquid, and with the ratio of dimethylformamide to N-carbamylimide, so widely that no generalization can be made.

My new N-carbamylimides fall into two distinct groups depending on the presence or absence of an olefinic group $>C=C<$ in a position alpha to at least one of the carbonyl groups. Such an olefinic group imparts extremely valuable properties to the N-carbamylimides. R. H. Snyder and P. O. Tawney have found, as disclosed in a copending application, Serial No. 395,281, filed November 30, 1953, that these N-carbamylimides react with non-tertiary alcohols to form N-carbamylamic esters which retain the olefinic group. These esters, in general, cannot be made by direct reaction between an N-carbamylamic acid and an alcohol. These esters can be copolymerized, through the olefinic group, with monomers such as styrene which contain at least one terminal vinyl group $CH_2=C<$ to form valuable new resins. These copolymers are described in detail in a copending application by Tawney, Serial No. 395,282, filed November 30, 1953. Obviously, the N-carbamylamic esters derived from those N-carbamylimides which lack an olefinic group cannot copolymerize in this way. Therefore, my most valuable N-carbamylimides are those containing an olefinic group $>C=C<$ which is alpha to at least one of the carbonyl groups.

For three reasons my preferred N-carbamylimide is N-carbamylmaleimide. (1.) The reagents maleic anhydride and urea, used in making it via the intermediate compound N-carbamylmaleamic acid (also known as maleuric acid), are cheap and available in unlimited amount. (2.) The olefinic group $>C=C<$ makes the N-carbamylmaleamic esters very easy to copolymerize because of its location alpha to both carbonyl groups. (3.) N-carbamylmaleimide is extremely valuable as the intermediate in making maleimide by my new process.

N-carbamylmaleimide is easily converted to maleimide and isocyanic acid, in at least 80% yield, by heating it above the temperature at which it decomposes. The isocyanic acid and/or its decomposition products distill smoothly and rapidly. When the reaction is complete, the maleimide then distills in very high yield and purity, leaving a residue of cyanuric acid. This procedure of making maleimide provides a new, commercially practical method of making maleimide without having to resort to prior pyrolytic cracking and pyrolysis techniques which limit the conversion and yield of maleimide by reason of homopolymerization and/or side reactions during pyrolysis.

The temperature at which I convert an N-carbamylimide to the corresponding imide may vary, as I have stated above, depending on the presence or absence of catalysts and/or solvents. When this reaction is used to prepare maleimide, the temperature range is usually between about 90° C. and about 185° C. Below 90° C. the solvent process is too slow. Above about 185° C., the yield of maleimide falls off because of increased production of undesirable by-products.

When the formation of maleimide, by my process, is carried out in solution I usually, but not necessarily, use a minimum of about 75 parts of dimethylformamide per 100 parts of N-carbamylmaleimide; i. e., a sufficient amount to dissolve all of the latter. When I use less than 75 parts of dimethylformamide the mixture becomes objectionably thick with cyanuric acid.

The N-carbamylamic acids used in preparing my new N-carbamylimides, by Reaction 1, can be made in any known manner. I have found, as disclosed in my copending application, Serial No. 312,869, filed October 2, 1952, a preferred method of making these N-carbamylamic acids. This method is illustrated as follows:

A solution of 500 g. of maleic anhydride and 300 g. of urea in 1000 ml. of glacial acetic acid is heated at 50° C. for 12 hours, during which time maleuric acid begins to crystallize. The mixture is allowed to cool and is left overnight at room temperature. The white crystalline maleuric acid is filtered off and washed with glacial acetic acid, and dried at 50° C. It melts at 161–2° C. with decomposition. Yield, 405 g., or 56% of theory.

In like manner other N-carbamylamic acids can be made from the corresponding cyclic anhydrides and a urea.

Typical cyclic anhydrides having the alpha-olefinic group are maleic anhydride, citraconic anhydride, itaconic anhydride, ethylmaleic anhydride, ethylidenesuccinic anhydride, beta-methylitaconic anhydride, and dimethylmaleic anhydride. Typical cyclic anhydrides which lack the alpha-olefinic group are succinic anhydride, methylsuccinic anhydride, ethylsuccinic anhydride, alpha, alpha-dimethylsuccinic anhydride, alpha, beta-dimethylsuccinic anhydride, propylsuccinic anhydride and isopropylsuccinic anhydride.

The urea can be urea itself ($NH_2-CO-NH_2$) or a urea which has a hydrocarbon radical instead of one of the hydrogen atoms. This radical can be any radical containing only carbon and hydrogen, such as an alkyl, alkenyl, cycloalkyl, terpenyl, aralkyl, or aryl group. Typical alkyl ureas are N-methylurea, N-ethylurea, N-propylurea, N-isopropylurea, N-n-butylurea, N-sec.-butylurea, N-isobutylurea, N-tert.-butylurea, the N-amyl-ureas, N-n-hexylurea, N-n-heptylurea, N-n-octylurea, N-n-nonylurea, N-n-dodecylurea, and N-n-octadecylurea. Typical alkenyl ureas are N-allylurea, N-methallylurea and N-crotylurea. A typical cycloalkyl urea is N-cyclohexylurea. A typical terpenyl urea is N-bornylurea. Typical aralkyl ureas are N-benzylurea and N-phenethylurea. Typical aryl ureas are N-phenylurea, the three N-tolylureas and the two N-naphthylureas.

N-carbamylamic acids made from any of these cyclic anhydrides can be used to make the corresponding new N-carbamylimides according to the process of my invention. Typical N-carbamylimides containing the alpha-olefinic group are N-carbamylmaleimide, N-carbamylcitraconimide, N - carbamylitaconimide, N - carbamyl-alpha-ethylmaleimide, N - carbamyl-alpha-ethylidenesuccinimide, N - carbamyl - beta-methylitaconimide, N-carbamyl - dimethylmaleimide, N - (methylcarbamyl)-maleimide, N - (ethylcarbamyl) - maleimide, N - (n-butylcarbamyl) - maleimide, N-(t-butylcarbamyl)-maleimide, N-(allylcarbamyl) - maleimide, N - (cyclohexylcarbamyl)-maleimide, N-(bornylcarbamyl)-maleimide, N-(benzylcarbamyl) - maleimide, N-(phenylcarbamyl)-maleimide, N - (ethylcarbamyl) - citraconimide, and N - (ethylcarbamyl)-itaconimide. Typical N-carbamylimides which lack the alpha-olefinic group are N-carbamylsuccinimide, N-carbamyl-alpha-methylsuccinimide, N-carbamyl-alpha-ethylsuccinimide, N - carbamyl-alpha, beta-dimethylsuccinimide, N - carbamyl - alpha-propylsuccinimide, N-carbamyl - alpha-isopropylsuccinimide, N-(ethylcarbamyl)-succinimide, N - (allylcarbamyl)-succinimide, N-(cyclohexylcarbamyl) - succinimide, N - (benzylcarbamyl)-succinimide, and N-(phenylcarbamyl)-succinimide.

It is apparent from Reaction 2 that two mols of aliphatic acid are formed in the conversion of each mol of an N-carbamylamic acid to the corresponding N-carbamylimide. As stated above, when the mother liquor, remaining after removal of the N-carbamylimide, is used in a second preparation of the same N-carbamylimide, I usually first remove at least part of the formed aliphatic acid to keep the reaction medium from being diluted unduly. This acid is customarily separated by distillation and used as the solvent in my improved process of making the N-carbamylamic acids. Further, the filter cake of an N-carbamylamic acid, still wet with the solvent acid, can be used in making the corresponding N-carbamylimide. For convenience this acid is the same one that is formed from the non-cyclic anhydride used herein, thus making cheaper the entire process starting with a cyclic anhydride and a urea.

The following examples illustrate my invention in detail; all parts are by weight.

Examples 1–7 illustrate the preparation of N-carbamylimides from the corresponding N-carbamylamic acids according to Reaction 1.

*Example 1*

A mixture of 50 parts of N-carbamylmaleamic acid and 120 parts of glacial acetic acid is heated to about 80° C.; acetic anhydride (50 parts) is added gradually to the stirred mixture, which is held at the same temperature until practically all of the suspended N-carbamylmaleamic acid has disappeared. The hot solution is filtered, and cooled to room temperature, causing crystallization of a white product. This material, the new compound N-carbamylmaleimide, melts at 157–158° C. The yield is 41 parts (92.5% of theory). The new compound reacts with water and with aqueous alkali to form N-carbamylmaleamic acid and its alkali salts, respectively. The latter reaction can be used quantitatively to determine the neutral equivalent weight (in this case it is the molecular weight also).

*Analysis.*— Calcd. for $C_5H_4N_2O_3$: nitrogen, 20.00%; neutral equivalent, 140. Found: nitrogen, 19.69%, 19.82%; neutral equivalent, 139.

*Example 2*

A mixture of 10 parts of N-carbamylsuccinamic acid (M. P. 218–220° C.) and 30 parts of acetic anhydride is heated at 95–100° C. for an hour with intermittent agitation, and then the mixture is cooled, filtered and dried. The white, crystalline N-carbamylsuccinimide, melting at 90–110° C., is obtained in 67% yield (6.0 parts).

*Analysis.*—Calcd. for $C_5H_6N_2O_3$: nitrogen, 19.7%; neutral equivalent, 142.1. Found: nitrogen, 19.7%; neutral equivalent, 141.6.

*Example 3*

A mixture of 2.0 parts of N-carbamylitaconamic acid (M. P. about 200° C., not sharp) and 10 parts of acetic anhydride is heated at 110° C. for a few minutes, i. e., until everything dissolves. The white product N-carbamylitaconimide crystallizes when the solution is cooled to room temperature. This product is filtered and dried. It melts at 92–98° C.; yield 1.0 part, or 56% of theory.

*Analysis.*—Calcd. for $C_6H_6N_2O_3$: nitrogen, 18.2%; neutral equivalent 154. Found: nitrogen, 17.8%; neutral equivalent, 158.

*Example 4*

A mixture of 3.0 parts of N-carbamylcitraconamic acid (M. P. 145–149° C.) and 10 parts of acetic anhydride is treated as described in Example 3. The white crystalline N-carbamylcitraconimide, melting at 110–115° C., is obtained in 65% yield (1.7 parts).

*Analysis.*—Calcd. for $C_6H_6N_2O_3$: nitrogen, 18.2%; neutral equivalent, 154. Found: nitrogen, 18.1%; neutral equivalent, 156.

A mixed melting point shows that the new N-carbamylimides shown in Examples 3 and 4 respectively are not identical.

*Example 5*

A mixture of 10 parts of N-(n-butylcarbamyl)-maleamic acid (M. P. 105.5–107.0° C.) and 27.5 parts of acetic anhydride is heated at 90–95° C. for 30 minutes with occasional stirring. Then slightly more than half of the acetic acid and acetic anhydride is distilled off in vacuo in order to induce crystallization. The N-(n-butylcarbamyl)-maleimide is filtered, washed with cold acetic anhydride and then with a mixture of benzene and Skellysolve B (a petroleum cut which is largely n-hexane). After recrystallization from a mixture of benzene and Skellysolve B the product, an off-white, fluffy mat of tiny needles, melts at 66.5–68.0° C. Yield, 6.8 parts, or 74% of theory.

*Analysis.*—Calcd. for $C_9H_{12}O_3N_2$: carbon 55.2%, hydrogen 6.1%, nitrogen 14.3%. Found: carbon 55.7%, 55.8%; hydrogen 6.2%, 6.2%; nitrogen 14.3%, 14.7%.

Example 6

A mixture of 6.7 parts of N-(phenylcarbamyl)-maleamic acid (M. P. 162–163° C.) and 30 parts of acetic anhydride is heated at 90–95° C. for 30 minutes, and then is cooled, and the N-(phenylcarbamyl)-maleimide is allowed to crystallize. It is filtered, washed with ether and recrystallized from benzene. The product is a pale yellow, glistening mass of tiny needles melting at 140–141° C.; yield 4.7 parts, or 76% of theory.

*Analysis.*—Calcd. for $C_{11}H_8O_3N_2$: carbon 61.0%, hydrogen 3.7%, nitrogen 13.0%; neutral equivalent, 216.2. Found: carbon 61.8%, 61.8%; hydrogen 3.8%, 3.5%; nitrogen 13.0%, 13.1%; neutral equivalent, 214.8.

Example 7

A mixture of 42.8 parts of N-(tert.-butylcarbamyl)-maleamic acid (M. P. 151.5–153.5° C.) and 76.5 parts of acetic anhydride is heated and concentrated as in Example 5. The N-(tert.-butylcarbamyl)-maleimide is filtered and recrystallized from carbon tetrachloride. The product crystallizes in the form of white, glistening, tiny platelets or needles, which melt at 106.0–107.5° C.; yield 27.5 parts, or 70% of theory.

*Analysis.*—Calcd. for $C_9H_{12}O_3N_2$: carbon 55.2%, hydrogen 6.1%, nitrogen 14.3%. Found: carbon 55.6%, 55.9%; hydrogen 6.10%, 6.14%; nitrogen 14.28%, 14.20%.

The following examples illustrate the conversion of N-carbamylimides into the corresponding imides in accordance with Reaction 2:

Example 8

N-carbamylmaleimide (40 parts) is heated at 4 mm. Hg pressure. At 180° C. decomposition, with a smooth evolution of heat and gaseous material, takes place. When the exothermic reaction has ended the maleimide is fractionally distilled in vacuo. Yield, 16.9 parts of maleimide (61% of theory); melting point, 88–91° C. A mixed melting point with an authentic specimen of maleimide establishes its identity with that made from N-carbamylmaleimide.

Example 9

A mixture of 20 parts of N-carbamylmaleimide and 10 parts of a stock solution, from 22 parts of anhydrous zinc chloride, 50 parts of glacial acetic acid, and 10 parts of acetic anhydride, is heated at 120° C. for a short time at 3 mm. Hg in order to remove the acid and the anhydride. (They are used in the process merely to disperse the zinc chloride uniformly in the N-carbamylmaleimide and to keep the system anhydrous.) The temperature of the residue is then gradually raised to 145° C., causing the desired decomposition to take place. The maleimide so formed is fractionally distilled, leaving behind the cyanuric acid formed by polymerization of isocyanic acid. The yield of maleimide is 8 parts (58% of theory).

Example 10

N-carbamylmaleimide (350 parts) is added gradually during 10 minutes to dimethylformamide (400 parts) with stirring at 95–100° C., and the solution is heated at this temperature for an additional hour. It then is cooled to room temperature, and filtered. The solid (crude cyanuric acid) is washed with several small portions of dimethylformamide and discarded. The combined filtrates are fractionally distilled in vacuo to isolate the maleimide and to recover the dimethylformamide for re-use. The yield of maleimide is 156 parts (64% of theory); melting point, 90–93° C.

N-carbamylmaleimide can also be converted to maleimide in o-dichlorobenzene. When using this solvent I prefer to add zinc chloride also in order to catalyse the reaction.

Example 11

N-carbamylsuccinimide (1.00 part) is heated in a sublimation apparatus for 1.5 hours at 108–122° C. at a pressure of 5.0–3.8 mm. of Hg, until sublimation has ended. Two white crystalline materials are obtained, in separate receivers. The first material to sublime is unchanged N-carbamylsuccinimide (0.07 part). The second one is succinimide (0.618 part, or a yield of 89% of theory), melting at 122–124° C. Its identity is established by a mixed melting point with an authentic sample of succinimide.

In like manner N-carbamylitaconimide and N-carbamylcitraconimide are converted into itaconimide and citraconimide, respectively.

Example 12

N-(t-butylcarbamyl)-maleimide was heated at 120° C. at a pressure of 100 mm. Hg for an hour, during which time decomposition and evolution of gaseous material occurred. This gaseous material, after liquefying in the Dry-Ice trap, remained liquid at room temperature and atmospheric pressure. It has a strong, but not unpleasant odor, which is characteristic of ti-butyl isocyanate—as described by Bühler and Fierz-David, Helv. Chim. Acta 26, 2133 (1943).

A portion of this clear liquid was treated with aniline to form a yellow crystalline solid. After recrystallization from benzene this product, presumed to be N-phenyl-N′-t-butylurea, melted at 163–164° C., although Bühler and Fierz-David reported that the melting point of their compound was 153° C.

Because of this discrepancy, the compound was next made by an alternate method, one used by Smith and Emerson, Org. Syn. 29, 19 (1949), to make a similar compound. N-phenylurea was mixed with concentrated sulfuric acid, and then t-butanol was gradually added to the mixture, the temperature being kept at 20–25° C. throughout the entire mixing operation. The mixture was left overnight at room temperature, and then was poured onto cracked ice. The solid precipitate was filtered, washed with water, dried, and finally recrystallized from benzene. It melted at 160–162° C., and a mixture of this product with that made from aniline and the volatile liquid formed from N-(t-butylcarbamyl)-maleimide melted at 161–163° C. Therefore, it is evident that the product formed by both methods is the same, and is N-phenyl-N′-t-butylurea. The melting point of 153° C. reported by Bühler and Fierz-David thus must be a typographical error, and should have been given as 163° C.

Example 13

N-(phenylcarbamyl)-maleimide was heated for three hours at 150° C. at 3 mm. Hg pressure. The liquid in the Dry-Ice trap was mixed with aniline, causing an immediate exothermic reaction and formation of a crystalline material which was recrystallized from ethanol. It melted at 235–238° C., both alone and when mixed with an authentic sample of carbanilide, thus establishing its identity, and showing that the original liquid formed in the decomposition was phenyl isocyanate.

Examples 12 and 13 show qualitatively that isocyanic esters can be recovered as such from the decomposition of my new N'-substituted N-carbamylimides. The corresponding cyclic imide, in these examples maleimide, also is formed in the reaction.

*Example 14*

A mixture of 120 parts of N-(t-butylcarbamyl)-maleimide, 6 parts of zinc chloride and 200 parts of orthodichlorobenzene was heated for two hours at a pot temperature of 102–111° C., at 100 mm. Hg. The still head temperature quickly rose to 29° C. and remained there throughout the reaction. The volatile material which evolved was partly condensed with tap water. The rest of the volatile product was caught in the Dry-Ice trap. At the end of two hours the reaction had to be stopped because the mixture in the pot began bumping so badly that there was danger of contaminating the distillate, although the reaction was incomplete. The distillate in both receivers was found to be t-butyl isocyanate. It had been formed in 56% yield up to the time of interruption (13 parts in the water-cooled receiver, and 23 parts in the Dry-Ice trap). Both fractions had the characteristic odor described in Example 12, and both fractions reacted, apparently quantitatively, with aniline to form N-phenyl-N'-t-butylurea.

The mixture of liquid and solid material in the pot was cooled below room temperature, and the solid was filtered off and then washed successively with o-dichlorobenzene and Skellysolve B. A small portion of the washed solid was digested in a small amount of hot benzene to extract maleimide contained in the solid, and then filtered. The filtrate was next evaporated to dryness, and then sublimed. White needles of maleimide were thus obtained as a sublimate. This product melted at 89–91° C., and when mixed with an authentic sample of maleimide, at 90–91° C.

In a similar experiment in which dimethylformamide was used as the solvent in place of dichlorobenzene, a 75% yield of t-butyl isocyanate was obtained before the decomposition was stopped because of bumping.

Having thus described my invention, what I claim and desire to protect by Letters Patent is:

1. An N-carbamylimide of an alpha-olefinic dicarboxylic acid, said acid having from four to six carbon atoms and having two carbon atoms between the carboxylic groups, the carbamyl group being

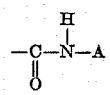

wherein A is a member selected from the class consisting of hydrogen and hydrocarbon radicals.

2. An N-carbamylimide of the class described in claim 1, wherein the said acid is a cis-butenedioic acid having from four to six carbon atoms.

3. An N-carbamylimide of the class described in claim 1, wherein the said acid is maleic acid.

4. As a new chemical, N-carbamylmaleimide.

5. As a new chemical, N-carbamylitaconimide.

6. As a new chemical, N-carbamylcitraconimide.

7. As a new chemical, N-(tert.-butylcarbamyl)-maleimide.

8. As a new chemical, N-(phenylcarbamyl)-maleimide.

9. A method of preparing cyclic imides which comprises heating above its decomposition temperature an N-carbamylimide compound defined as set forth in claim 1.

10. A method as set forth in claim 9 in which the heating is carried out in the presence of zinc chloride.

11. A method as set forth in claim 9 in which the heating is carried out in the presence of a solvent for the N-carbamylimide chosen from the class consisting of N,N-dimethylformamide and o-dichlorobenzene.

References Cited in the file of this patent
UNITED STATES PATENTS

| | | |
|---|---|---|
| 2,271,122 | Harman | Jan. 27, 1942 |
| 2,444,536 | Searle | July 6, 1948 |
| 2,516,836 | Drechsel et al. | Aug. 1, 1950 |
| 2,643,258 | Miller et al. | June 23, 1953 |
| 2,682,526 | Flory | June 29, 1954 |
| 2,698,845 | Mastin et al. | Jan. 4, 1955 |
| 2,725,385 | Seeger et al. | Nov. 29, 1955 |
| 2,742,475 | Hoffmann et al. | Apr. 17, 1956 |
| 2,745,841 | Tawney et al. | May 15, 1956 |

OTHER REFERENCES

Pearson et al., J. Org. Chem., vol. 15, pp. 1055 and 1057 (1950).